United States Patent [19]

Isago

[11] Patent Number: 4,717,959
[45] Date of Patent: Jan. 5, 1988

[54] AUTOMATIC FOCUSING DEVICE FOR VIDEO CAMERA OR THE LIKE

[75] Inventor: Koki Isago, Kanagawa, Japan

[73] Assignee: Ricoh Company, Ltd., Tokyo, Japan

[21] Appl. No.: 863,169

[22] Filed: May 14, 1986

[30] Foreign Application Priority Data

May 16, 1985 [JP] Japan ................................. 60-104,695

[51] Int. Cl.⁴ .............................................. H04N 5/38
[52] U.S. Cl. ..................................... 358/227; 354/402
[58] Field of Search ................ 358/227; 354/402, 404

[56] References Cited

U.S. PATENT DOCUMENTS 4,422,097 12/1983 Inuiya .................................... 358/227
4,615,598 10/1986 Koshiishi ............................. 358/227

*Primary Examiner*—James L. Dwyer
*Assistant Examiner*—L. C. Schroeder
*Attorney, Agent, or Firm*—Oblon, Fisher, Spivak, McClelland, & Maier

[57] ABSTRACT

An automatic focusing device for use with a solid-state self-scanned image sensor having a rectangular light detecting area for scanning an object image and converting the same to a video signal, including a focus detecting means, a driver means and a control means. The focus detecting means produces a focus signal from the video signal. The driver means moves a focusing lens group in an image-forming lens system in one direction or the other along its optical axis in increments or steps each equal to a predetermined small distance $\Delta x$. The control means is responsive to the focus signal for controlling the driver means to bring the lens group into a position in which a maximum focus signal is produced. Even after the lens group has been brought into the properly focused position, the control means controls the focus detecting means to generate a focus signal and resumes the focusing process when the generated focus signal varies beyond a certain value.

1 Claim, 4 Drawing Figures

AUTOMATIC FOCUSING DEVICE FOR VIDEO CAMERA OR THE LIKE

BACKGROUND OF THE INVENTION

1. Field of the Invention

The present invention relates to an automatic focusing device for a video camera, an electronic still camera, or the like.

2. Discussion of Background

Solid-state self-scanned image sensors of area configuration with a rectangular light detecting area, such as CCDs, PDAs, and the like have found use as imagers in video cameras and electronic still cameras, for example. Such solid-state self-scanned image sensors of area configuration are capable of producing not only video signals, but also focus signals. An automatic focusing system which operates by relying on a focus signal produced by a solid-state self-scanned image sensor of area configuration is referred to as a frequency detecting system since a high-frequency component of a video signal is detected and a focus signal is generated on the basis of an increase or decrease in the high-frequency component.

The frequency detecting system is however disadvantageous in that it is difficult to determine the direction in which the lens position lies, i.e., to ascertain whether the lens is in a front focus position or a rear focus position, and hence the lens tends to oscillate back and forth across a well focused position. Another problem of the frequency detecting system is that if the object to be imaged is of a low contrast or the position of an image formed by the lens is widely spaced from the imaging surface, then the system is prone to errors because the focus signal remains substantially unchanged when the lens is slightly moved.

SUMMARY OF THE INVENTION

In view of the aforesaid drawbacks of the conventional automatic focusing device, it is an object of the present invention to provide an automatic focusing device which is capable of reliably determining the direction in which the lens position lies and which is free of operation errors.

An automatic focusing device according to the present invention is designed for use in a video camera or an electronic still camera which employs a solid-state self-scanned image sensor of area configuration. The automatic focusing device has a focus detecting means, a driver means, and a control means.

The driver means serves to move such a lens group in an image forming lens system which is involved in focus adjustment. The lens group is moved in one direction or the other along its optical axis in increments or steps each equal to a prescribed small distance $\Delta x$.

The focus detecting means produces a focus signal from a video signal.

The control means performs a focusing operation and a focusing-process resuming operation. The focusing operation is performed by moving the lens group with the driver means, producing focus signals at three adjacent positions that are $\Delta x$ spaced from adjacent ones, determining the distance for which, and the direction in which, to move the lens group based on the magnitude relationship between these three focus signals, and effecting a process required to displace the lens group to a position where a maximum focus signal is generated.

In the focusing-process resuming operation, a focus signal is still generated even after the lens group has been moved to the position of the maximum focus signal by the foregoing focusing operation, and when the focus signal varies beyond a certain value, the above focusing operation is resumed. According to this focusing-process resuming capability, the lens group can immediately be focused for a different object by focus adjustment.

With the above arrangement of the automatic focusing device, the lens group can be stopped in a proper position in the vicinity of a well focused position while effectively preventing errors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

Figure 1:
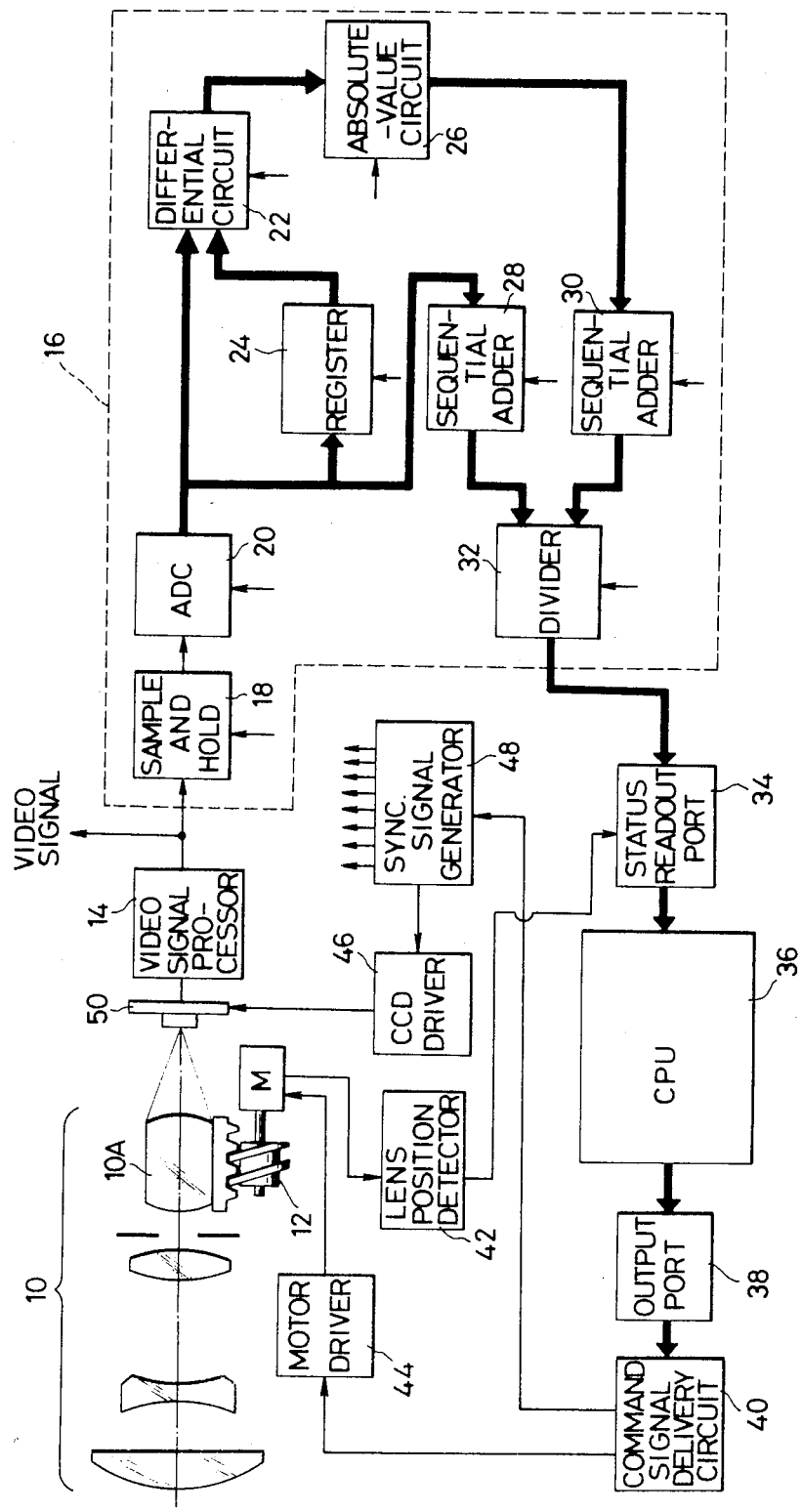
FIG. 1 is a block diagram of an automatic focusing device according to the present invention.

Referring now to the drawings, and more particularly to FIG. 1 thereof, there is shown an automatic focusing device associated with an image-forming lens system 10 including a lens group 10A involved in focus adjustment. The lens group 10A is movable along its optical axis in one direction or the other by a lens moving mechanism 12 comprising a worm gear assembly driven by a motor M. The lens group 10A is movable in increments or steps each equal to a prescribed small distance $\Delta x$. The lens moving mechanism 12, the motor M, and a motor driver circuit 44 jointly constitute a driver means.

The automatic focusing device includes a focus detecting means 16 comprising a sample and hold circuit 18, an A/D converter 20, a differential circuit 22, a register circuit 24, an absolute-value circuit 26, sequential adders 28, 30, and a divider 32.

The automatic focusing device also includes a control means comprising a status readout port 34, a CPU 36, an output port 38, a command signal delivery circuit 40, a lens position detector 42, CCD driver 46, and a synchronizing signal generator 48.

Light coming from an object through the image-forming lens system 10 falls on a charge-coupled device (CCD) 50 which is a solid-state self-scanned image sensor of area configuration. When the CCD 50 is driven by the CCD driver 46, the light applied to the CCD 50 is photo-electrically converted to an electric signal which is in turn converted to a video signal by a video signal processor 14. The video signal is then supplied to a VTR, a TV motor, or the like (not shown) and also to the focus detecting means 16.

Figure 4:
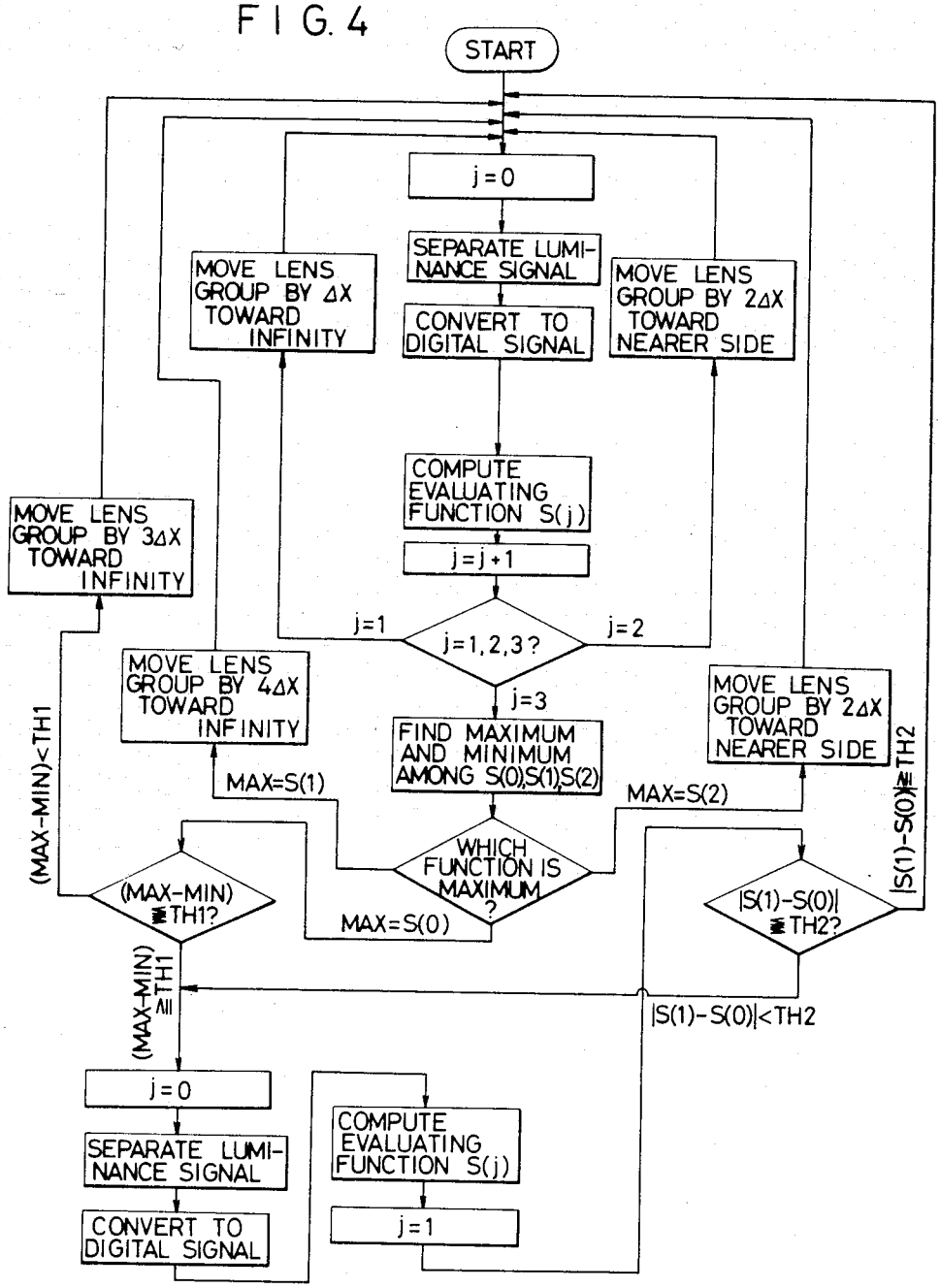
FIG. 4 is a flowchart of an operation sequence for the focusing process.

Operation of the automatic focusing device will be described with reference to FIG. 1 and also to FIG. 4 which is a flow chart showing an automatic focusing process. A signal from a particular line in a focus-signal extracting region is separated as a luminance signal from the video signal and applied to the sample and hold circuit 18. If there are n pixels on the particular line, then a luminance signal for the n pixels is applied to the sample and hold circuit 18. The sample and hold circuit 18 then samples and holds the applied luminance signal for every k pixels ($k \geq 1$). The sampled and held signal is converted to a digital signal by the A/D converter 20. Assuming that the digitized luminance signal is expressed by V, there are produced luminance signals $V(k), V(2k), V(3k), \ldots, V(Nk)$ ($Nk=n$) for the n pixels where $k, 2k, \ldots, Nk$ are pixel numbers.

These luminance signals $V(k), \ldots$ are applied to the differential circuit 22, the register circuit 24, and the sequential adder 28.

When supplied with the luminance signals $V(k), \ldots,$ the register circuit 24 issues these luminance signals in the order in which they are applied, while delaying them by a time corresponding to one period of sample and hold in the sample and hold circuit 18. The output signal from the register circuit 24 is applied to the differential circuit 22. Assuming that the pixel numbers $k, 2k, 3k, \ldots, ik, \ldots, Nk$ are indicated by $1, 2, 3, \ldots i, \ldots, N$, respectively, the luminance signals $V(k), V(2k), \ldots, V(Nk)$ can generally be expressed as $V(i)$ ($i=1$ through $N$).

As described above, the differential circuit 22 is supplied with the output signal from the A/D converter 20 and the output signal from the register circuit 24. Since the output signal from the register circuit 24 is delayed, the signals $V(i)$ and $V(i-1)$ are simultaneously applied to the differential circuit 22. The differential circuit 22 then produces the difference $V(i)-V(i-1)$ and applies the same to the absolute-value circuit 26, which then issues the absolute value $|V(i)-V(i-1)|$ to the sequential adder 30. The sequential adder 30 sequentially adds these absolute values $|V(i)-V(i-1)|$ that are successively applied thereto, and produces a sum signal $$\sum_{i=2}^{N} |V(i) - V(i-1)|.$$

The sequential adder 28 generates a sum signal $$\sum_{i=1}^{N} V(i).$$

These sum signals from the sequential adders 28, 30 are applied to the divider 32 which produces $$S = \frac{\Sigma |V(i) - V(i-1)|}{\Sigma V(i)}$$

This difference signal S is a focus signal produced as an output signal from the focus detecting means 16. The timing at which the CCD driver 46 and the circuit components of the focus detecting means 16 are driven is controlled by the CPU 36 through the synchronizing signal generator 48.

The focus signal S is determined by the object to which the image-focusing lens system 10 is directed and the position of the lens group 10A. Assuming that there are objects A, B, ... to be imaged and the position of the lens group 10A is expressed by L, the focus signal S when the position of the lens group 10A is L for the object A can be expressed by SA(L). Thus, the focus signal is regarded as a function with the object as a parameter and the position L of the lens group 10A as a variable, the function being hereinafter referred to as an evaluating function.

Figure 2:
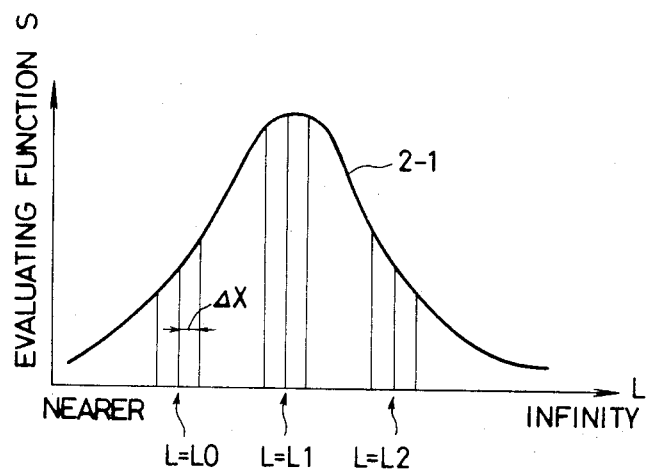
FIG. 2 is a diagram explaining a focusing process.

The evaluating function S is generally shaped as shown in FIG. 2. An in-focus image can be achieved by bringing the lens group 10A into the position in which the value of the evaluating function S is maximum.

Therefore, the function of the control means is to locate the lens group 10A in the position in which the evaluating function or the focus signal is of the greatest value. This operation will be described below.

It is assumed that when the CCD 50 is driven, the lens group 10A is positioned at $L=L0$ in FIG. 2, and if the object is A, the evaluating function SA(L) is indicated by the curve of FIG. 2. The focus signal S generated by the focus detecting means 16 under this condition is SA(L0).

The evaluating function SA(L0) is applied through the status readout port 34 to the CPU 36. In response to the evaluating function SA(L0), the CPU 36 energizes the motor driver 44 through the output port 38 and the command signal delivery circuit 40 to drive the motor M. As the lens group 10A is moved by the motor M, the position of the lens group 10A is continuously detected by the lens position detector 42 and applied via the status readout port 34 to the CPU 36.

The lens group 10A is first moved a prescribed small distance $\Delta x$ in a predetermined direction, e.g., toward infinity, so that the lens group is positioned at $(L0+\Delta x)$. When an evaluating function $SA(L0+\Delta x)$ in this position is applied, the CPU 36 issues a command to move the lens group 10A a distance $2\Delta x$ toward the nearer side. When an evaluating function $SA(L0-\Delta x)$ in this new position $(L0-\Delta x)$ is applied, the CPU 36 determines the magnitude relationship between the evaluating functions $SA(L0-\Delta x)$, $SA(L0)$, $SA(L0+\Delta x)$ at the three adjacent positions $(L0-\Delta x)$, $L0$, $(L0+\Delta x)$ that are $\Delta x$ spaced apart, i.e., the CPU 36 ascertains which are the maximum and the minimum among these three evaluating functions. Then, the difference (MAX—MIN) between the maximum and minimum evaluating functions is computed. The direction in which and the distance for which to move the lens group 10A are determined according to the magnitude relationship between the three evaluating functions.

In the above example, the maximum evaluating function is $SA(L0+\Delta x)$, and the lens group 10A is in the position $(L0-\Delta x)$ at the time the three evaluating functions are computed.

The fact that the evaluating function $SA(L0+\Delta x)$ is maximum means that the lens group 10A must be moved further toward infinity in order to bring the object image into focus. Therefore, the lens group 10A is moved $4\Delta x$ toward infinity, and the new position of the lens group 10A is now $(L0-\Delta x+4\Delta x)=(L0+3\Delta x)$. Then, evaluating functions are determined in this position $(L0+3\Delta x)$ and positions $(L0+2\Delta x)$, $(L0+4\Delta x)$ that are spaced $\Delta x$ from the position $(L0+3\Delta x)$. Based on the magnitude relationship between these evaluating functions, the lens group 10A is moved again in the manner described above. The aforesaid process is repeated to move the lens group 10A progressively toward infinity.

If the lens group 10A is in the position $L=L2$ in FIG. 2 when the video image is produced by the CCD 50, then the lens group 10A is first moved $\Delta x$ toward infinity, and then $2\Delta x$ toward the nearer side. Therefore, evaluating functions $SA(L2)$, $SA(L2+\Delta x)$, $SA(L2-\Delta x)$ are computed in the three adjacent positions that are Δx apart. At this time, the lens group 10A is in the position SA(L2−Δx), and the evaluating function SA(L2−Δx) is maximum among the three evaluating functions. Accordingly, the lens group 10A is moved 2Δx toward the nearer side. The above process is repeated to bring the lens group 10A progressively toward the nearer side.

The direction in which to move the lens group 10A is determined by the magnitude relationship between the three evaluating functions. As the above process is repeated, the lens group 10A moves nearer the peak of the evaluating function 2-1 (FIG. 2) irrespective of the initial position of the lens group 10A. Evaluating functions in three adjacent lens positions are denoted at S(0), S(1), S(2) computed with j as a parameter in the flowchart of FIG. 4.

When the lens position reaches the position L=L1 in FIG. 2, evaluating functions SA(L1), SA(L1+Δx), SA(L1−Δx) in three adjacent positions L1, (L1+Δx), (L1−Δx) are computed according to the above process. At this time, the evaluating function SA(L1) is maximum among the three evaluating functions. This means that the position L1 is closest to the peak of the curve 2-1, and is the position of the maximum evaluating function which can be achieved. Inasmuch as the lens group 10A is in the position (L1−Δx) when the evaluating functions SA(L1), SA(L1+Δx), SA(L1−Δx) are obtained, the lens group 10A is moved Δx toward infinity into the position L1. The lens group 10A is now in the properly focused position in which the image is in focus.

The evaluating function curve 2-1 as illustrated in FIG. 2 has a sufficiently sharp peak portion with its base having a low gradient. At the base of the curve, the position of the lens group 10A is widely spaced from the well focused position at the peak of the curve. Since the gradient of the evaluating function is low at the base of the curve, when evaluating functions in three adjacent positions LS, (LS+Δx), (LS−Δx) at the base are compared, it might be possible for the evaluating function SA(LS) to be judged as the maximum due to an error. If the position LS were judged as the properly focused position, the device would operate in error. At the base of the evaluating function curve, the difference (MAX−MIN) between the maximum and minimum evaluating functions among SA(LS), SA(LS+Δx), SA(LS−Δx) is generally small. To prevent the above error, therefore, the difference (MAX−MIN) is compared with a certain threshold level TH1, and when (MAX−MIN)<TH1, the position of the lens group is regarded as being widely spaced from the well focused position. As a consequence, the lens group is moved 3Δx toward infinity, and the above process is repeated.

When the object A is no longer required to be imaged and the object B is now to be imaged, the lens group 10A should immediately be controlled to provide an in-focus image of the object B. This control of the lens group 10A can be achieved in the following manner:

When the lens group 10A reaches the properly focused position while the image-forming lens system 10 is directed to the object A, the lens group 10A is stopped in the properly focused position. However, the evaluating function continues to be computed so that the evaluating function or the focus signal is checked by the CPU 36 for a variation ΔS. If the signal variation ΔS becomes greater than a predetermined threshold level TH2, then the focusing process as described above is resumed. Insofar as the lens group remains at rest, the evaluating function may be computed periodically at each frame, e.g., at each 1/30 msec. for NTSC.

Figure 3:
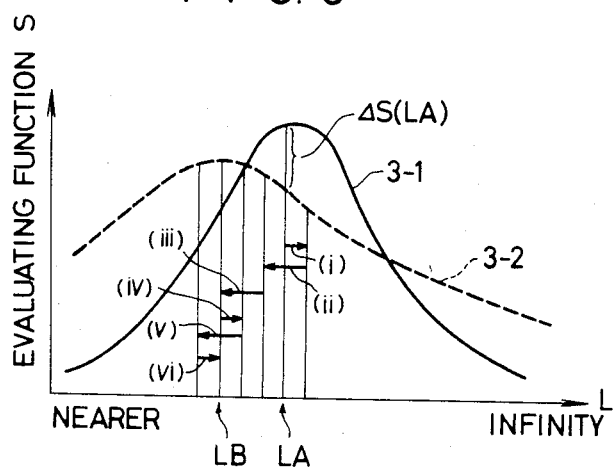
FIG. 3 is a diagram explaining a focusing process to be effected when a different object is to be imaged.

For example, it is assumed that the evaluating function for the object A is indicated by 3-1 and the evaluating function for the object B is indicated by 3-2 in FIG. 3. If the image-forming lens system 10 is directed to the object A and the image is in focus, then the lens group 10A is in the position L=LA. When the object B is now to be imaged, the evaluating function changes from SA(LA) to SB(LA), resulting in a difference ΔS=SA(LA)−SB(LA). If |ΔS|≧TH2, then the focusing process is resumed In the focusing process, the lens focus 10A is moved successively as indicated by the arrows (i), (ii), (iii), (iv), (v), (vi) until it reaches the properly focused position L=LB in which the image of the object B is in proper focus, and then the lens group 10A is stopped. The threshold level TH2 depends upon the characteristics of the hardware shown in FIG. 1, e.g., the resolution of the A/D converter 20, the sampling time of the sample and hold circuit 18, the area for extracting the luminance signal from the video signal, etc. Generally, however, the threshold levels TH1, TH2 should preferably be selected to meet the relationship TH2>TH1.

Instead of employing the CPU 36, the control means may comprise a combination of independent control circuits capable of performing their respective control functions corresponding to the various steps of the aforesaid process. The focus detecting means 16 may be an analog circuit arrangement rather than the illustrated digital circuit arrangement. Furthermore, other evaluating functions than described above may be used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter Patent of the United States is:

1. An automatic focusing device for use with a solid-state self-scanned image sensor having a rectangular light detecting area for scanning an object image and converting the same to a video signal, said image sensor being associated with an image-forming lens system including a focusing lens group, said automatic focusing device comprising:
   focus detecting means for producing a focus signal from the video signal;
   driver means for moving the focusing lens group along an optical axis thereof in increments each equal to a distance Wx; and
   control means for effecting a focusing operation by moving the focusing lens group with said driver means, producing focus signals at three adjacent positions that are Wx spaced from adjacent ones, determining the distance for which, and the direction in which, to move the focusing lens group based on the magnitude relationship between these three focus signals, and effecting a process required to displace the focusing lens group to a position where a maximum focus signal is generated, and for effecting a focusing-process resuming operation by generating a focus signal even after the focusing lens group has been moved to the position of the maximum focus signal, and resuming said focusing operation when the focus signal varies beyond a certain value;

said focus detecting means comprising a sample and hold circuit for sampling and holding the focus signal, an A/D converter for converting the focus signal to a digital signal, a register circuit for delaying said digital signal, a differential circuit for determining the difference between said digital signal and said delayed digital signal, an absolute-value circuit for producing the absolute value of said difference, a first sequential adder for adding sequentially applied values of said digital signal, a second sequential adder for adding sequentially applied values of absolute value, and a divider for dividing the sum produced from said first sequential adder by the sum produced from said second sequential adder;

said driver means comprising a mechanism for moving said focusing lens group, a motor for driving said mechanism, and a driver circuit for driving said motor; and said control means comprising a lens postion detector for detecting the position of the focusing lens group, a status readout port for reading the position of the focusing lens group from said lens position detector and an output signal from said divider, an image sensor driver for driving said image sensor, a synchronizing signal generator for applying synchronizing signals to said driver and said focusing detecting means, a CPU responsive to an output signal from said status readout port for generating a command signal, an output port for issuing the command signal from said CPU, and a command signal delivery circuit for delivering the command signal to said driver circuit and said synchronizing signal generator.

* * * * *